(No Model.)　　　　　　　　　　　　　　　　　5 Sheets—Sheet 1.
P. HANSON.
HARVESTING MACHINE.
No. 402,824.　　　　　　　　　　Patented May 7, 1889.
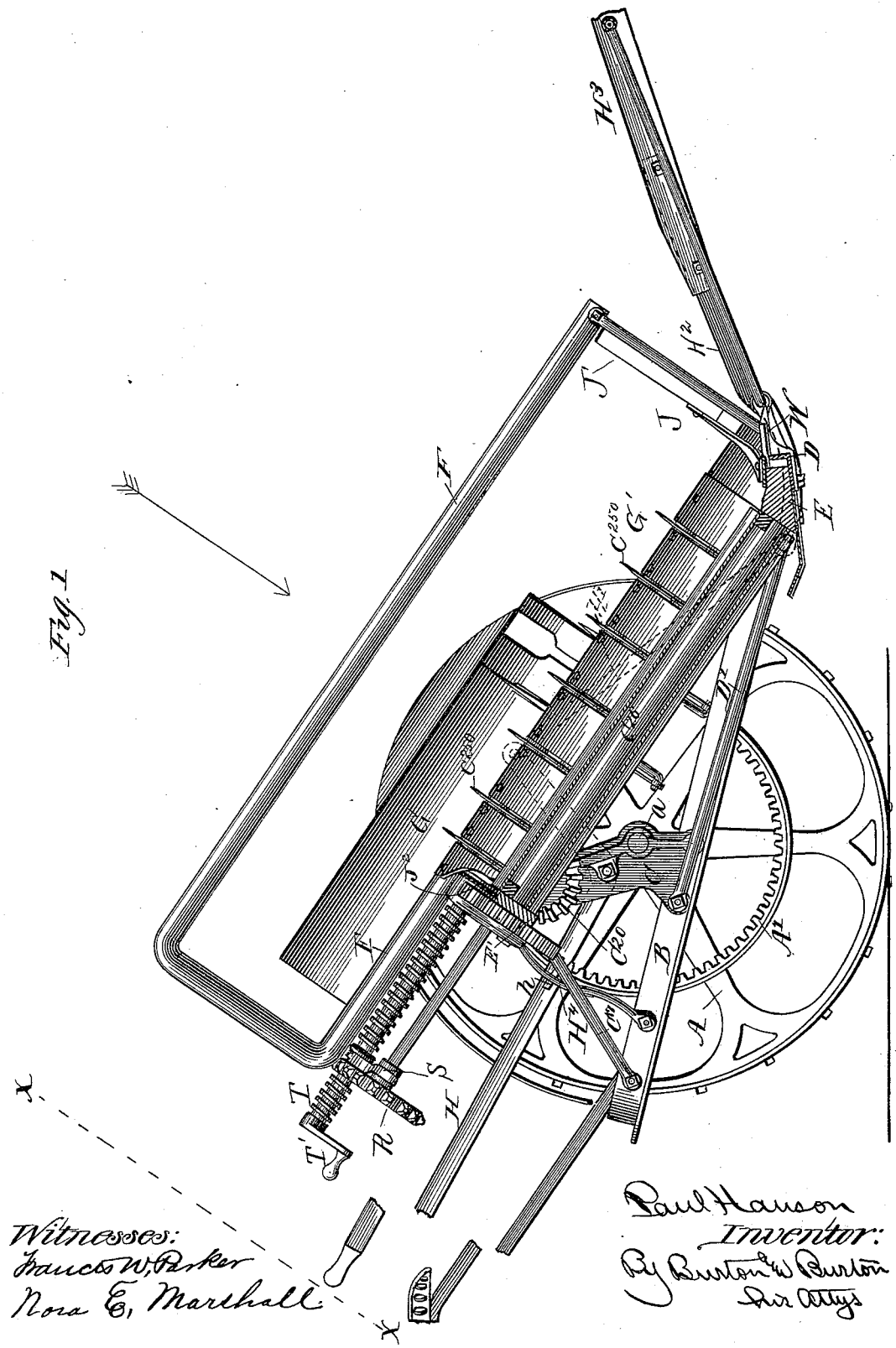
Witnesses:
Francis W. Parker
Nora E. Marshall
Paul Hanson
Inventor:
By Burton & Burton
His Attys (No Model.) 5 Sheets—Sheet 2.
P. HANSON.
HARVESTING MACHINE.
No. 402,824. Patented May 7, 1889.
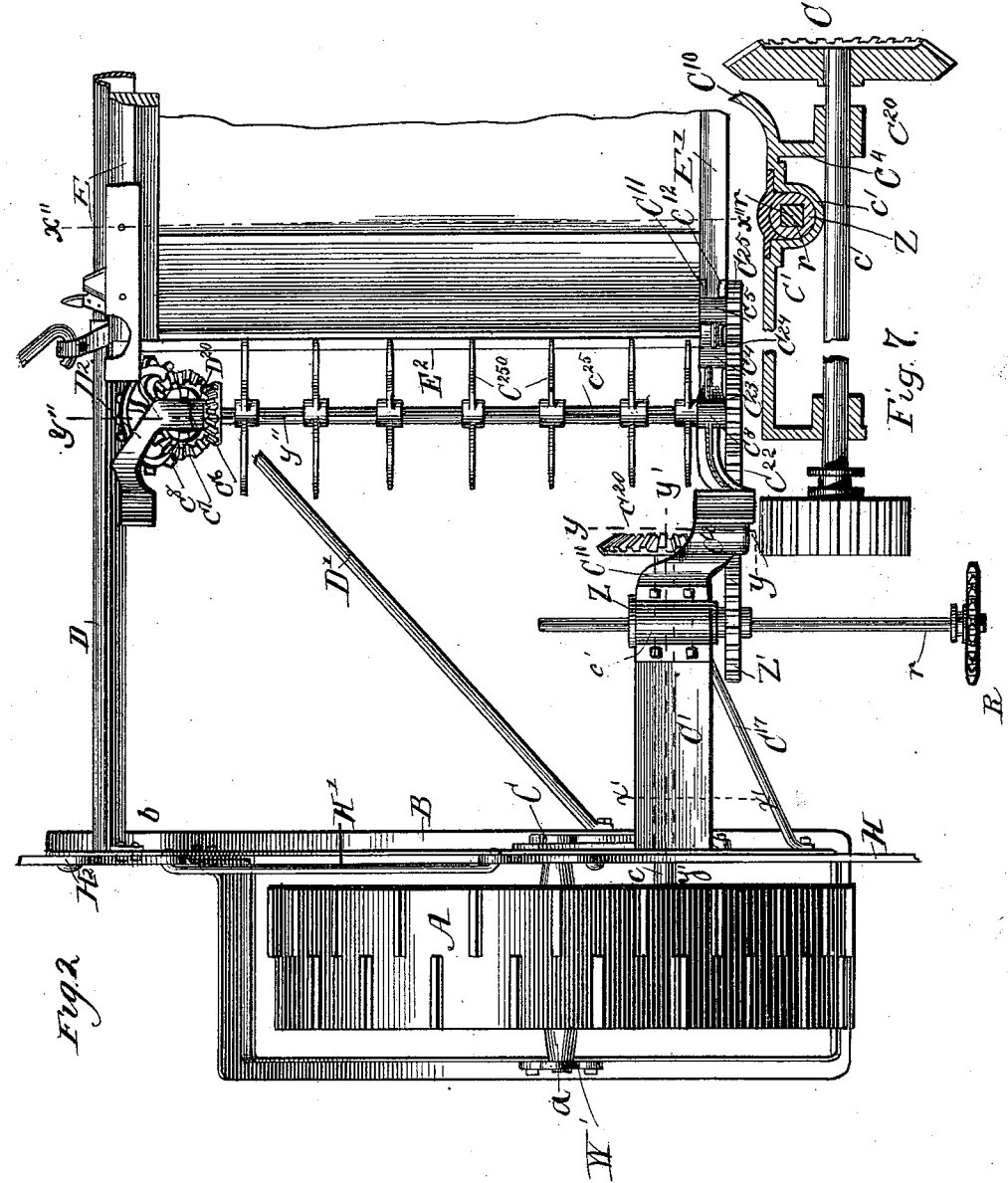
Witnesses:
Francis W. Parker
Nora E. Marshall
Inventor:
Paul Hanson
By Burton and Burton, Attys

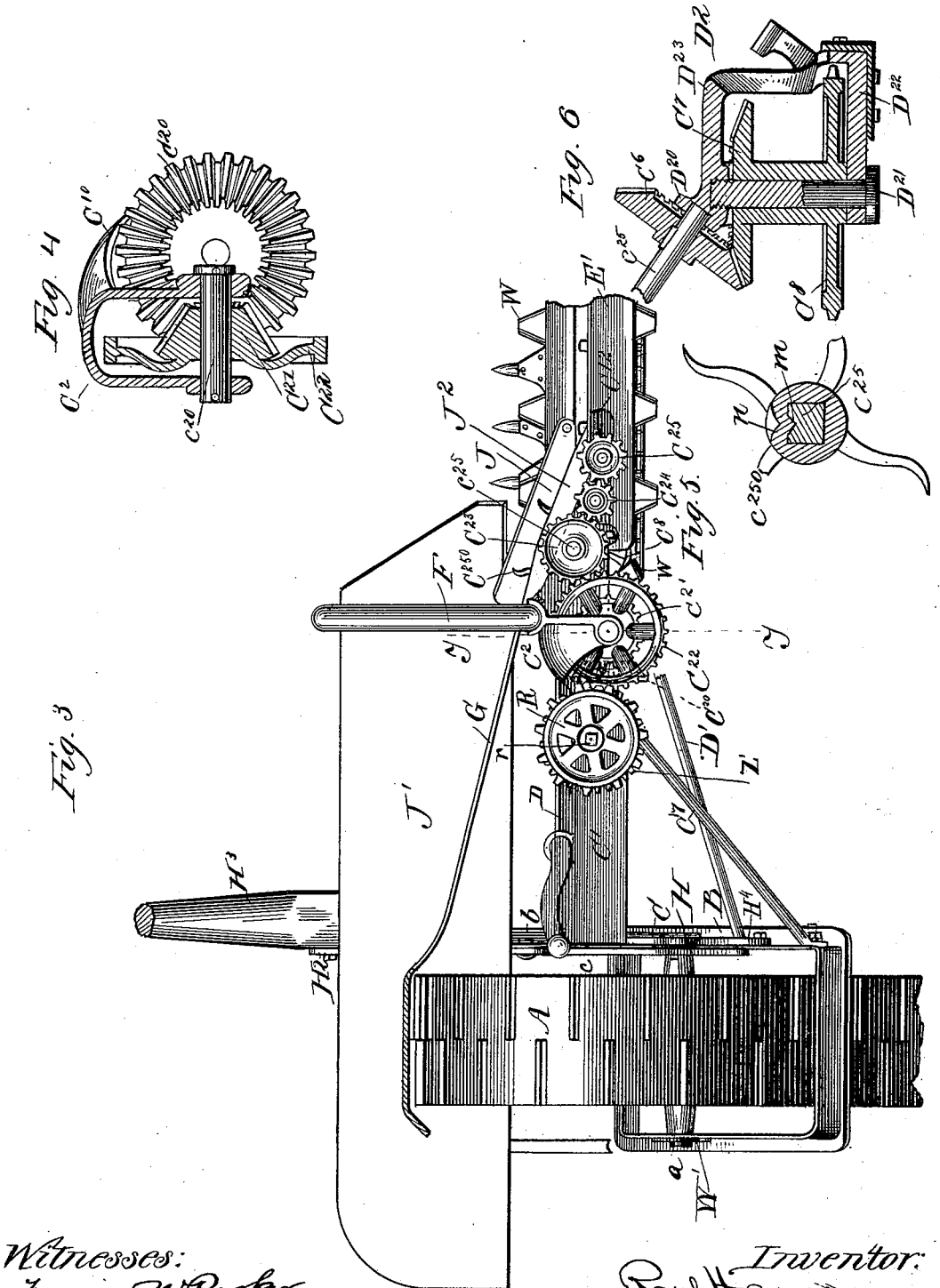

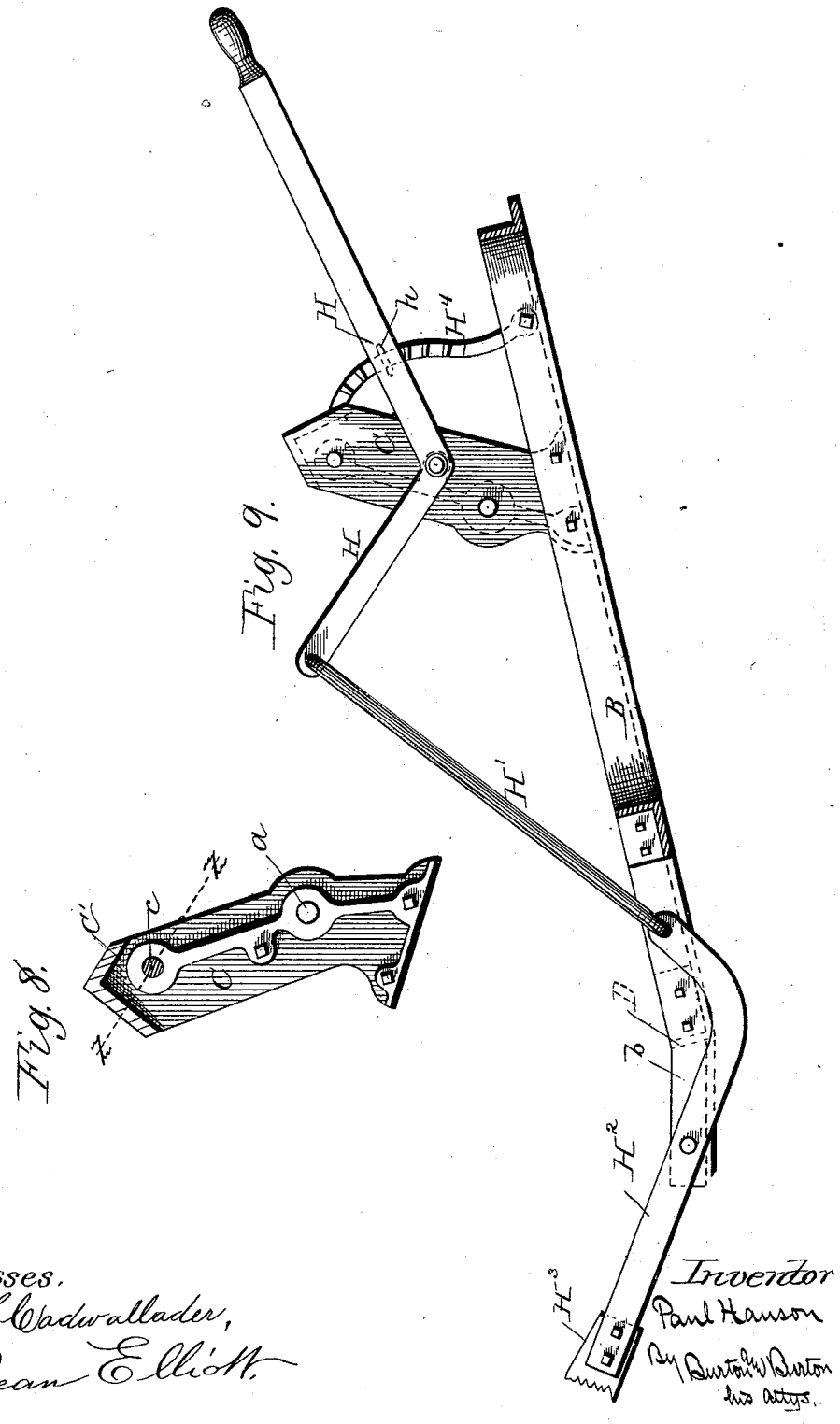

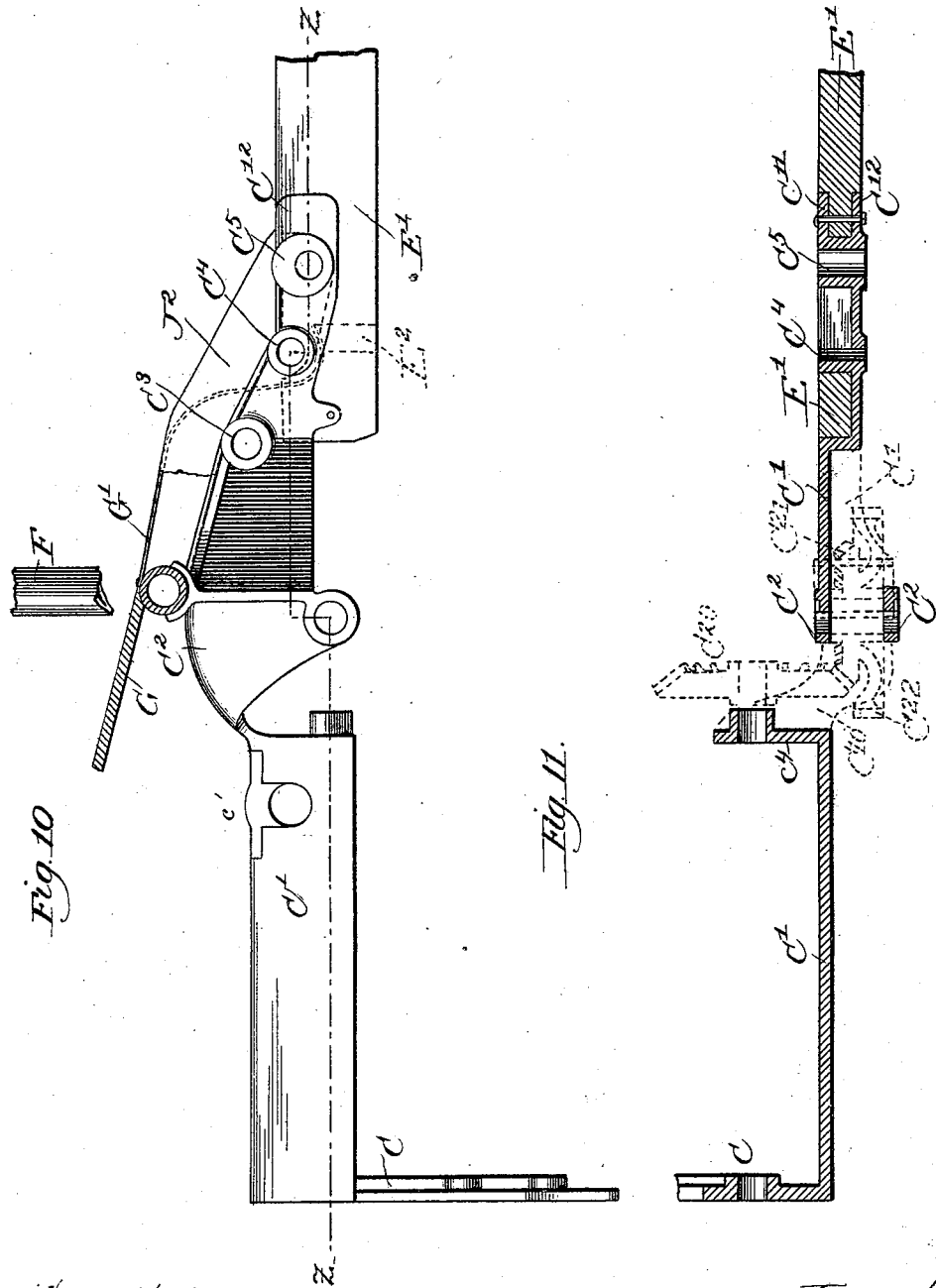

UNITED STATES PATENT OFFICE.

PAUL HANSON, OF ST. PAUL, MINNESOTA.

HARVESTING-MACHINE.

SPECIFICATION forming part of Letters Patent No. 402,824, dated May 7, 1889.

Application filed September 5, 1887. Serial No. 248,903. (No model.)

*To all whom it may concern:*

Be it known that I, PAUL HANSON, a citizen of the United States, residing at St. Paul, in the county of Ramsey and State of Minnesota, have invented certain new and useful Improvements in Harvesting-Machines, which are fully described in the following specification, reference being had to the accompanying drawings, forming part thereof, wherein—

Figure 1 is a grain-side elevation, partly sectional, the section being made at the plane indicated by the line $x'' x''$ of Fig. 2. Fig. 2 is a plan looking in the direction of the arrow on Fig. 1, all the upper deck or covering being removed as well as all parts of the mechanism and frame-work which pertain solely to the binder. Fig. 3 is a projection of the parts in Fig. 1 upon a plane indicated by the line $x x$. Fig. 4 is a vertical section in the plane indicated by the lines $y y$ of Figs. 2 and 3. Fig. 5 is a section through the picker-shaft and one of the toothed clearing-wheels thereon, showing the mode of securement of said wheel. Fig. 6 is a vertical section of gearing and bracket at the forward end of the picker-shaft made on the line $y'' y''$ of Fig. 2, showing the communication of power to the cutting mechanism. Fig. 7 is a section through $y' y'$ on Fig. 2. Fig. 8 is a section through the line $X' X'$ on Fig. 2. Fig. 9 is an elevation of the tilting mechanism. Fig. 10 is a detail rear elevation of a bracket which forms part of the frame, the rear sill and slight other portions of the frame being shown also in connection with said bracket. Fig. 11 is a section through said bracket at the plane indicated by the lines $z z$ on Figs. 8 and 10.

A is the drive-wheel.

A' is the main driving-gear rim or master wheel thereon.

$a$ is the drive-wheel axle.

The main frame comprises the wheel-frame B, which is made of angle-iron bar bent so as to pass entirely around the drive-wheel, forming a four-sided frame, the extension $b$ at one end of said angle-iron bar running from the inner side of the frame B, projecting forward and affording securement for the pole, and the other end of said bar being securely bolted to the said inner side of the wheel-frame against the outer surface thereof, thus completing the circuit of the wheel at the inner forward corner; the bracket or gearing-frame C, which is securely bolted to the inner side of the wheel-frame B and affords bearing for the drive-wheel axle and other parts, as hereinafter explained; the bracket W', which is secured to the wheel-frame on the outer side to afford an outer bearing for the axle $a$; the finger-bar D, which is made fast to the inner side of the wheel-frame at a point somewhat forward of the front inner corner on the same extension of the inner side of that frame which affords securement to the pole and is braced by the brace D', which extends from a point on the finger-bar near the inside divider obliquely back to the wheel-frame, to which said brace is made fast at any convenient point, far enough back to make it afford good bracing to the finger-bar; the bracket $D^2$, secured to the finger-bar to serve the purposes hereinafter pointed out; the platform-frame, which comprises front and rear sills, E and E', respectively, the former secured to the finger-bar and the cross-bar $E^2$ joining said sills at the stubble end, and the bent tubular frame F, shaped like the letter U turned upon its side, whose principal functions relate to the binder, which is not directly involved in this application, but is fully described in my application No. 248,902, filed September 5, 1887. So far as the present application is concerned this frame F is involved only as affording by its lower bar a support and securement to the decking indicated by the letters G G'. All these parts, except the part G of the decking, which are described as constituting the main frame, are rigidly united and constitute a unitary structure which operates as integral, all moving together in all adjustments, and having no capability of adjustment except by rocking over the main axle. This adjustment is effected by means of the bell-crank lever H, which is pivoted on the bracket C, and has one arm extended rearward to serve as a handle and the other arm extended upward and forward and connected to the link H', which is connected also to the rear end of the bar $H^2$, which is the rear end and a rearward extension of the pole $H^3$. By rocking the bell-crank lever H over its pivot the angle of the pole to the frame is changed, the forward end of the pole being stationary, being upheld by the neck-yoke, and the elevation of the finger-bar is changed.

To secure the machine in any position to which it is thus adjusted, the segment $H^4$ is secured to the wheel-frame B and notched on the side toward the lever H, and said lever has a tooth, $h$, adapted to enter said notches. The spring of the lever is sufficient to permit it to be disengaged from the segment by a sidewise push, and its stiffness is sufficient to keep it engaged until thus disengaged.

The bracket C comprises two principal portions, which are, however, integral with each other—viz., the upright part and the horizontally-extended part C'. It is secured to the frame B by bolts through the lower end of the upright part, and a little above the frame B it has the bearing for the axle $a$, and from that point extends upward, leaning somewhat rearward, and has a bearing for the main driving pinion-shaft $c$. Above that bearing the horizontally-extended part C' of the bracket starts off grainward. This part is angle-shaped, having the apex upward and both flanges or lips oblique, sloping one rearward and the other forward over the shaft $c$ like a roof. In this form it extends about eighteen inches grainward, and at that distance there is formed in it a box, $c'$, for the hub Z of the gear-wheel Z', and beyond that point it has a vertical diaphragm, $c^4$, in which the main driving-pinion shaft $c$ obtains another bearing.

Beyond that bearing there is secured upon the shaft $c$ the beveled gear-wheel $C^{20}$, which meshes with and drives the beveled gear-wheel $C^{21}$, whose bearings are at right angles to those of the shaft $c$. Integral with the beveled gear-wheel $C^{21}$ is the spur gear-wheel $C^{22}$, which communicates motion to the remainder of the train. The horizontal extension C' of the bracket C is expanded into a housing, $C^2$, for the beveled gear-wheel $C^{21}$ and the spur gear-wheel $C^{22}$, said housing commencing in the curved portion $C^{10}$, springing from the flanges of the horizontally-extended angle-shaped portion of the bracket up over the beveled gear-wheel $C^{20}$, and then in the form of a yoke striding the two integral wheels $C^{21}$ and $C^{22}$, and through the lower ends of this yoke a pin, $c^{20}$, is inserted, which serves as an axle for said wheels. Beyond this housing the horizontally-extended portion of the bracket C has successively the bearings $C^3$, $C^4$, and $C^5$ for the gear-wheels $C^{23}$, $C^{24}$, and $C^{25}$, respectively. The first of these wheels, $C^{23}$, is fixed upon the shaft $c^{25}$, called the "picker-shaft," which carries the toothed clearing-wheels $C^{250}$, which revolve through slots in the slotted part G' of the deck to clear the grain off of the conveyer. The second wheel, $C^{24}$, is an idle or intermediate gear-wheel only, which communicates power to the gear-wheel $C^{25}$, which is fixed on the shaft of the conveyer driving-roller $C^{26}$ and rotates the same. To the grainward end of the horizontal extension C' of the bracket C the rear sill is secured to said bracket, the latter terminating in the lugs $C^{11}$ and $C^{12}$, which clasp the upper edge of the sill, which itself extends stubbleward to about the position of the picker-shaft, being cut away at the top for the bearings $C^4$ and $C^5$, as shown in dotted line in Fig. 10.

To the finger-bar D is secured the bracket $D^2$, which has the bearing $D^{20}$ for the forward end of the picker-shaft, and a vertical shaft, $D^{21}$, inserted through the lower arm, $D^{22}$, and screwed into the upper arm, $D^{23}$, of the bracket, and serving as the bearing of the beveled gear-wheel $C^7$ and the sprocket-wheel $C^8$, which are formed integrally. The picker-shaft carries at its forward end, just back of its bearing in the bracket $D^2$, the beveled gear-wheel $C^6$, which drives the beveled gear-wheel $C^7$. The sprocket-wheel $C^8$ drives a chain which carries the cutters W. This cutting mechanism is not designed to be claimed in this application, but it is fully described and claimed in an application by me filed September 24, 1887, No. 250,624. For the purpose of this application it is sufficient to notice that the sprocket-wheel $C^8$, and hence the plane of movement of the cutters which it drives, is horizontal. It should be noticed, also, that the forward sill, E, which is secured to the horizontal flange or lip of the angle-iron finger-bar, has its back edge beveled off, and that the conveyer, which extends back, sloping upward at right angles to the beveled edge of the sill, makes an angle with the upper surface of the sill and with the plane of the cutter mechanism, which is horizontal.

The inclination of the platform-conveyer will vary somewhat as affected by the tilting or raising and lowering of the cutters by rocking the whole machine over the axle; but independently of that it is designed to be at all times considerably inclined—say from thirty to forty-five degrees from the horizontal. Also, the finger-bar being somewhat farther forward than the front of the drive-wheel, the conveyer sloping up from the finger-bar or from a few inches in the rear of it passes above and in front of the line of the drive-wheel axle. The effect of thus locating and inclining the conveyer is that the delivery side is but little lower than the drive-wheel, and the grain needs only to be very slightly raised in order to be discharged over the wheel, and I make a deck, G G', which slopes from the delivery side of the conveyer stubbleward and upward to the top of the wheel, preserving at the same time the described inclination from front to rear, so that the rear edge, which is the highest, slopes upward toward the wheel and passes over the wheel at the top of the latter, while the forward edge, which is lower, also slopes upward toward the wheel and passes over it at a point on its forward curve lower than the top of the wheel. I thus avoid the necessity of an elevator. A binder whose frame will in part support the portion G of the deck is designed to be sustained upon the main frame and operate above said portion G of the deck, and its ordinary packing mechanism will forward the grain over the said portion of the sloping deck, which is secured to and partakes of the fore-and-aft movement of the binder-frame; but that forms no part of this invention, and is not herein shown; but such a binder is fully described in my application, No. 248,902, filed September 5, 1887. The grainward portion G' of the deck is curved above the picker-shaft $c^{25}$ and slotted for the teeth of the clearing-wheels, and is made of a separate piece or pieces from the remainder G of the deck. This portion G' is preferably made of sheet metal, which is secured at the grainward side upon the upper edge of the cross-bar $E^2$ and at the stubbleward side to the tubular frame F.

The picker-shaft $c^{25}$ is made square, except for a short distance at its bearings, and the toothed clearing-wheels $C^{250}$ have their hubs provided with corresponding square openings, so that they may be slipped onto the shaft; and in order to hold them in proper place on the shaft without the necessity for pinning through the shaft, which is objectionable, because the holes drilled for the pins weaken the shaft, I make the wheels of malleable iron, with a thin spot, $n$, in their hubs, and at the points on the shaft where the wheels are to be located I make slight countersinks $m$, and, having placed the wheels on the shaft with the spot $n$ over the countersink $m$, I sink the iron of the hub into the countersink by use of a taper-pointed punch, and thus fix them securely in position.

The distance which the grain has to be lifted to pass over the drive-wheel is partly covered by these clearing-wheels $C^{250}$, which are preferably made, as shown, of considerable diameter, so that in clearing the grain off of the conveyer they also lift it several inches and lodge it upon the deck beyond them, where it is several inches higher than at the edge adjacent to the conveyer.

On account of the slope of the deck forward, which gives the grain a tendency to slide endwise butts foremost, it is desirable to provide a stop for the grain at the forward edge of the deck, and for this purpose I provide the board J', secured to any convenient part of the frame-work and extending to a point near the inside divider, which is about in line with the end of the conveyer directly across in front of the wheel. This board is not inclined—that is, in the direction of its length—but is wide enough to cover the whole slope of the deck as it rises toward the wheel. To check the grain against sliding forward when rising over the curved and slotted portion G' of the deck, the plate J is bolted to the upper surface of the front sill, E, and extends stubbleward in front of the forward end of the said curved part G' of the deck. It is slightly bent up at the forward part and fastened at the forward and stubbleward corner to the lower edge of the board J'. At the rear end of the platform-conveyer, at the discharge side thereof, I locate the stripping-board $J^2$, which is set up edgewise, secured to the rear sill, and extends stubbleward in the rear of the rearmost clearing-wheel to the tubular frame F, being directly above the portion of the grainward extension C' of the bracket C, which has the bearings $C^3$, $C^4$, and $C^5$. This stripping-board $J^2$ supports the heads of long grain, and, extending grainward past the vertical plane of the delivery side of the conveyer, it strips such long grain off the conveyer and keeps it out of the gear-wheels $C^{24}$ and $C^{23}$.

In order to stiffen the bracket C a diagonal brace, $C^{19}$, is secured to the frame B near the rear thereof, and is extended thence upward and grainward and fastened to the horizontally-extended part of the bracket at any convenient point as far grainward as possible. As illustrated, it is connected at the diaphragm, which affords the bearing for the main pinion-shaft at its grainward end. The square shaft $r$ slides through the hub Z, and at its rear end carries a sprocket-wheel, R, whose hub has a bearing in a bracket which forms a part of the binder-frame, of which a small portion is shown at S, Fig. 1. T is a screw-shaft which is screwed through said bracket S, and provided with a crank-arm, T', at the rear to rotate it. The purpose of this shaft is to adjust the binder back and forward. This construction is not herein claimed nor fully ilustrated, but is set forth and claimed in my application No. 248,902, filed simultaneously herewith.

I claim—

1. In combination with the drive-wheel, the wheel-frame, the finger-bar secured to said frame below the level of the drive-wheel axle and extended rigidly grainward, the bracket C, secured to the wheel-frame and extended first upward and then grainward, the platform-frame having the front sill on the finger-bar and the rear sill secured to the elevated and horizontally-extended part of the bracket C considerably higher than the axle, substantially as set forth.

2. In combination with the wheel-frame, the finger-bar and the bracket C, both secured to the wheel-frame, and the latter having a horizontal extension grainward, the braces $C^7$ and D' extending from the inner side of the wheel-frame, the former upward and grainward to the horizontal extension of the bracket, and the latter forward and grainward to the finger-bar to constitute said parts a unitary rigid structure, substantially as set forth.

3. In combination with the frame which encircles the drive-wheel, a bracket secured to such frame and extended upward and grainward therefrom, having a bearing for the drive-wheel axle and for the main driving-pinion shaft, and the conveyer-platform frame having its rear sill secured to the grainward end of said bracket, substantially as set forth.

PAUL HANSON.

Witnesses:
FRED GERLACH,
CHAS. S. BURTON.